(No Model.)
S. V. BAHME.
CAR BRAKE.
No. 513,228. Patented Jan. 23, 1894.
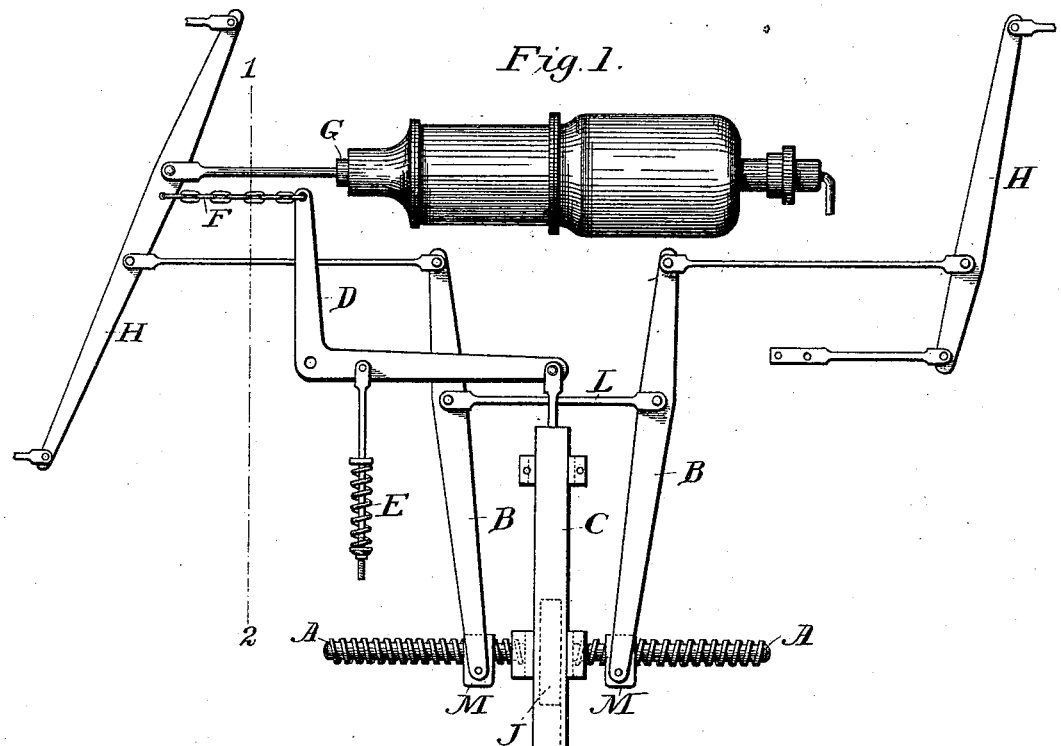
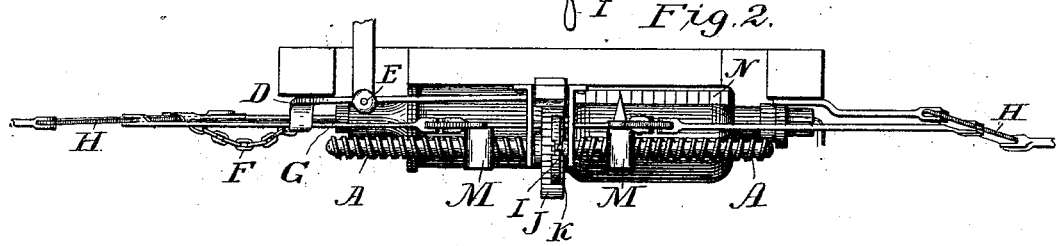
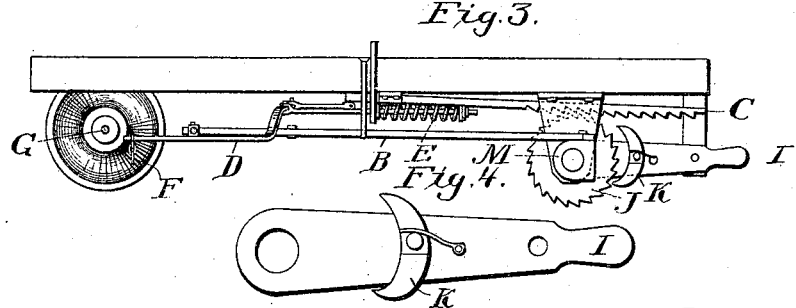
Witnesses:
James C. Haynes
Henry E. Smith
Inventor.
Samuel V. Bahme
THE NATIONAL LITHOGRAPHING COMPANY,
WASHINGTON, D. C.

UNITED STATES PATENT OFFICE.

SAMUEL V. BAHME, OF ELLENSBURG, WASHINGTON.

CAR-BRAKE.

SPECIFICATION forming part of Letters Patent No. 513,228, dated January 23, 1894.

Application filed August 11, 1893. Serial No. 482,888. (No model.)

*To all whom it may concern:*

Be it known that I, SAMUEL V. BAHME, a citizen of the United States, residing at Ellensburg, in the county of Kittitass and State of Washington, have invented a new and useful Railway-Vehicle Brake, of which the following is a specification.

My invention relates to improvements in overcoming what is commonly known as too much slack or lost motion in railway vehicle brakes.

The objects of my improvements are to provide a self-adjusting brake gear in such a manner as to take up the slack or lost motion automatically as the brake shoes may wear or the brake gear give to the heavy strain it is under while brake is applied; also that of affording a governor for the travel of the piston of power-brakes, so that it will give a uniform travel of the same at all times until the brake shoes are worn out. I attain these objects by the mechanism illustrated in the following specification and accompanying drawings, in which—

Figure 1, is a perspective view of the top, entire machine as it appears applied to a car. Fig. 2, is a side view of the same. Fig. 3, is a sectional view of Fig. 1 on line 1, 2, and Fig. 4, is a detailed view of the hand lever I, and the pawl K.

Similar letters refer to similar parts throughout the several views.

The chain F, is adjusted with sufficient slack to allow the piston G, to travel a specified distance. When it passes beyond this it stretches this chain F, moving with it the triangular bar or lever D, and the ratchet bar C. When brake is released the lever D, and the bar C, are drawn forward in their former position by the coil spring E, and turning the ratchet wheel J, to which is attached the right and left screw A, A, spreading the lugs M, M, to which are connected the levers B, B, connected by the rod L, thus shortening the distance between the levers H, H, as fast as the brake shoes are worn out. (The levers H, H, are connected by means of a rod to the live truck lever which I did not think it necessary to illustrate in the drawings.) This object is attained by adjusting the chain according to length of piston travel desired. Whenever the piston travels beyond the specified distance these operations are repeated at every application of the brake until piston travel is brought back to the specified point when they stop, only to repeat them again as fast as the brake shoes may wear.

Fig. 4, is an enlarged illustration of the hand lever I, and the pawl K. This lever is used as a hand adjustment, as a stationary lock for the wheel J, and as a lever for throwing the wheel J, and the ratchet bar C, and the pawl K, all out of gear to allow wheel J, to be turned in either direction if so desired. By loosening the lever I, from its position and pressing down on it, produces the same result as the coil spring E, the lever D, and ratchet bar C. By pressing the lever I upward against the bar C, all are thrown out of gear, and the wheel J, and the right and left screw A, A, can be turned at the discretion of the operator.

N, Fig. 2, is a scale to be observed when hand adjustments are made. By turning the wheel J, forward sufficient to move the point one inch to the right shortens the piston travel one inch. Turning it backward has the opposite effect. Each mark on the scale represents one inch of piston travel.

I am aware that heretofore there has been in use various appliances for the adjusting of the gear of railway vehicle brakes. I therefore do not claim such a combination broadly; but What I do claim is—

In a car brake the right and left screw A, A, the levers B, B, connected to the lugs M, M, the rod L, the chain F, the lever D, the spring E, the ratchet-bar C, the hand lever I, the pawl K, and the ratchet-wheel J, substantially as described.

SAMUEL V. BAHME.

Witnesses:
 HENRY E. SMITH,
 JAS. C. HAYNES.